United States Patent [19]

Mathias

[11] Patent Number: 5,359,380
[45] Date of Patent: Oct. 25, 1994

[54] ANTI-REFLECTION FILTER SUPPORT SYSTEM

[75] Inventor: Harry M. Mathias, Marina del Rey, Calif.

[73] Assignee: Panavision International, L.P., Tarzana, Calif.

[21] Appl. No.: 985,849

[22] Filed: Dec. 3, 1992

[51] Int. Cl.$^5$ .............................................. G03B 11/00
[52] U.S. Cl. ................................................... 354/295
[58] Field of Search .......................... 354/295; 355/71

[56] References Cited

U.S. PATENT DOCUMENTS

| | | | |
|---|---|---|---|
| 4,007,471 | 2/1977 | Land et al. | 354/295 |
| 4,383,735 | 5/1983 | Stravitz | 354/295 |
| 4,669,846 | 6/1987 | Koch et al. | 354/295 |
| 4,687,312 | 8/1987 | Navarro | 354/295 |
| 4,901,098 | 2/1990 | Salles | 364/295 |
| 5,208,624 | 5/1993 | Mackay | 354/295 |

FOREIGN PATENT DOCUMENTS

| | | |
|---|---|---|
| 0083430 | 7/1983 | European Pat. Off. . |
| 2620-833 | 3/1989 | France . |
| 2074330 | 10/1981 | United Kingdom . |
| 2097546 | 11/1982 | United Kingdom . |
| 9221053 | 11/1992 | World Int. Prop. O. . |

OTHER PUBLICATIONS

Arri Spare Parts List from the Arri Photographic Equipment Manual, pp. 10, 10A, 39–45, 62–66 and 69.
Arri Techn.-Information brochure.
Alfred Chrosziel Film-Technik GmbH brochure.

*Primary Examiner*—Michael L. Gellner
*Assistant Examiner*—Nicholas J. Tuccillo
*Attorney, Agent, or Firm*—Lyon & Lyon

[57] ABSTRACT

A camera system including a matte box assembly for use on cameras for supporting a plurality of filters, the matte box assembly including a filter holder mechanism which is insertable into the matte box assembly. The filter holder accommodates a bottom filter element and a top filter element, the filter elements stacked in the frame in parallel relationship to one another, one on top of the other, with the bottom filter element engaging the lower ledge portion of the frame member.

23 Claims, 5 Drawing Sheets

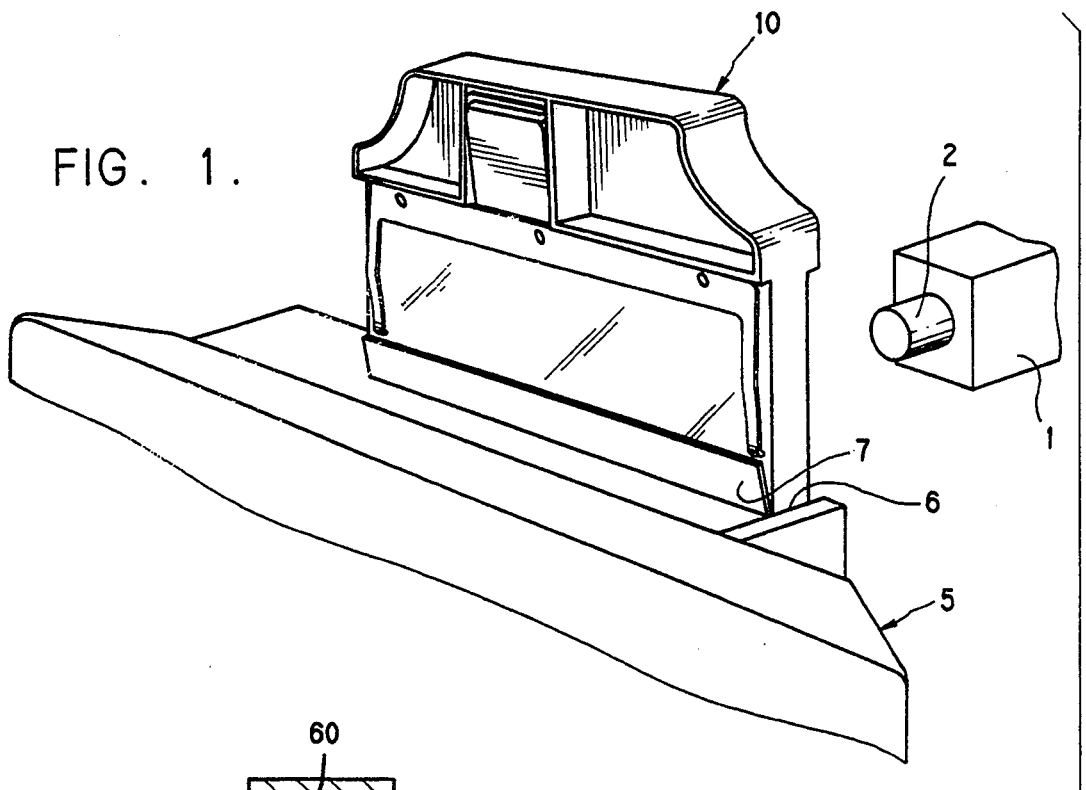
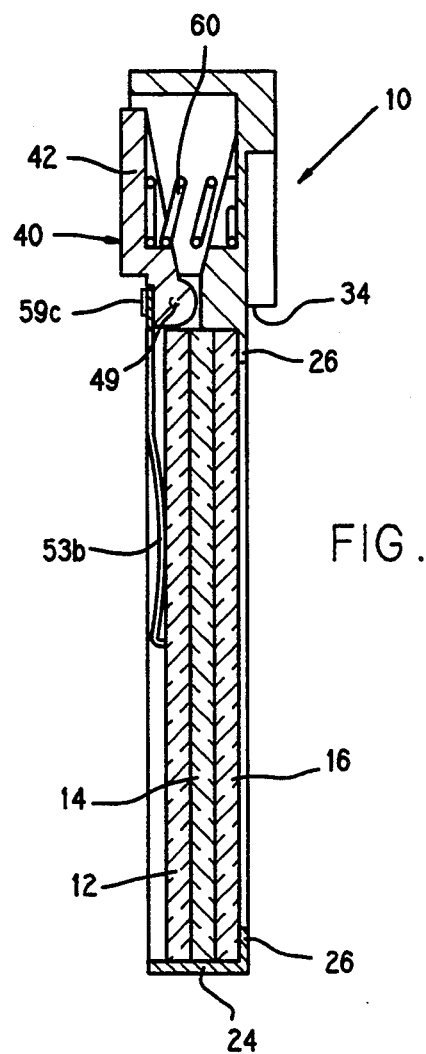
FIG. 1.
FIG. 3.

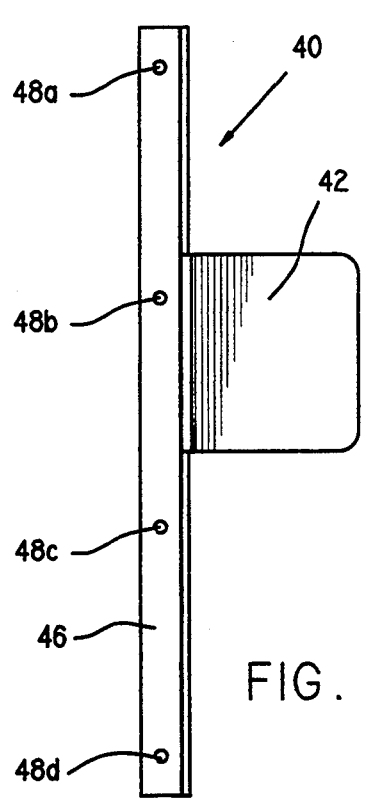
FIG. 9.
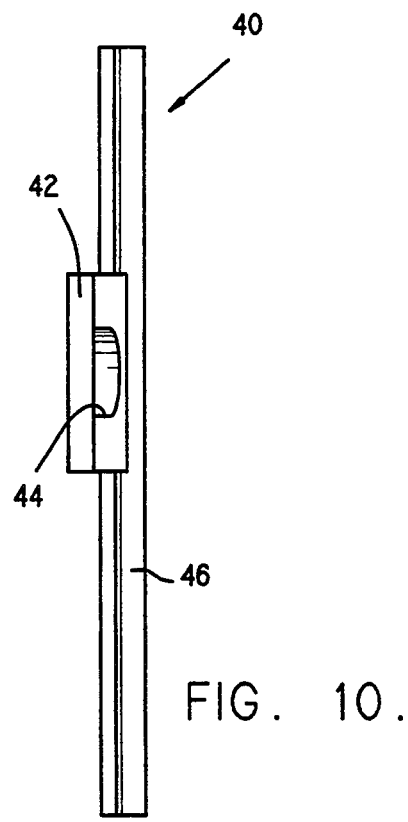
FIG. 10.
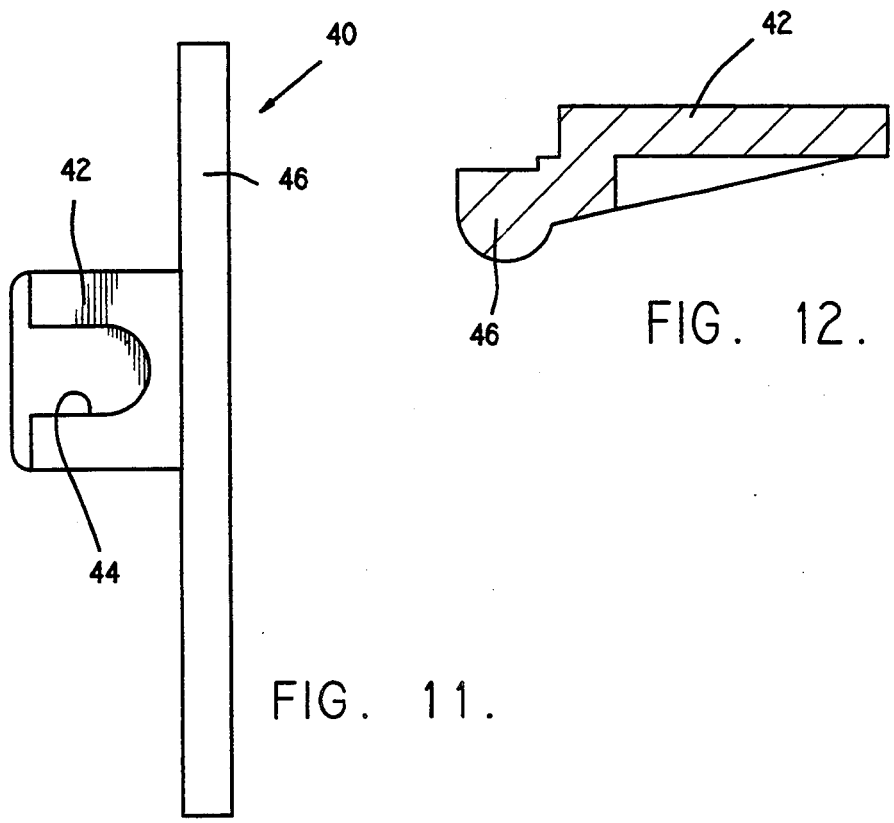
FIG. 11.
FIG. 12.

ANTI-REFLECTION FILTER SUPPORT SYSTEM

BACKGROUND OF THE INVENTION

The field of the present invention relates to a filter and matte box support systems or more simply a filter support assembly for use with a matte box on a camera and, in particular, for use on professional motion picture or video cameras requiring a variety of different filters to achieve the desired high quality motion picture.

As set forth in U.S. Pat. No. 4,687,312, it is a well known practice in the professional motion picture industry to employ several different types of filters within a so-called matte box in front of the camera lens to produce the high quality picture or special coloring or other visual effects desired for the motion picture. The filters may be of several different types including various color and light polarizing filters.

As cameras have been made smaller, it has been desirable for the entire camera system, including the matte box assembly and filters, to also be made smaller. A smaller filter and matte box assembly may result in a smaller, lighter and less expensive device. Additionally, the closer the filters are to the lens, the smaller the filter may be. Therefore, a thinner or narrower filter holder may desirably place the filter as close as possible to the lens thereby maximizing overall size reduction of the filter and matte box assembly.

In the typical matte box assembly, the filters are secured in a filter frame and together inserted into the matte box. Currently used filter frames have a certain thickness in order to secure the filter. When positioning multiple filters, the filters are necessarily installed with an air gap between adjacent filters. The present inventor has recognized that undesirable reflection occurs between the filters and that such reflection may be minimized by reducing or eliminating the air gap.

SUMMARY OF THE INVENTION

The present invention relates to an improved camera system including a filter holder mechanism insertable into a matte box for use on cameras for supporting a plurality of filters. The filter holder accommodates a variable number of filters (one or more) in a manner such that the filters are positioned and urged against one another without an air gap therebetween.

BRIEF DESCRIPTION OF THE DRAWINGS

FIG. 1 is a front perspective view of a matte box assembly according to the present invention with a filter holder assembly partially inserted into the matte box assembly;

FIG. 3 is a cross-sectional view of the filter holder as in FIG. 1 taken along line 3—3;

FIG. 9 is a front side elevation view of the pivot bar of the filter holder of FIG. 2;

FIG. 10 is a bottom plan view of the pivot bar of FIG. 9;

FIG. 11 is a rear side elevation view of the pivot bar of FIG. 9; and

FIG. 12 is a cross sectional view of FIG. 9 taken along line 11—11.

DETAILED DESCRIPTION OF THE PREFERRED EMBODIMENTS

Figure 2:
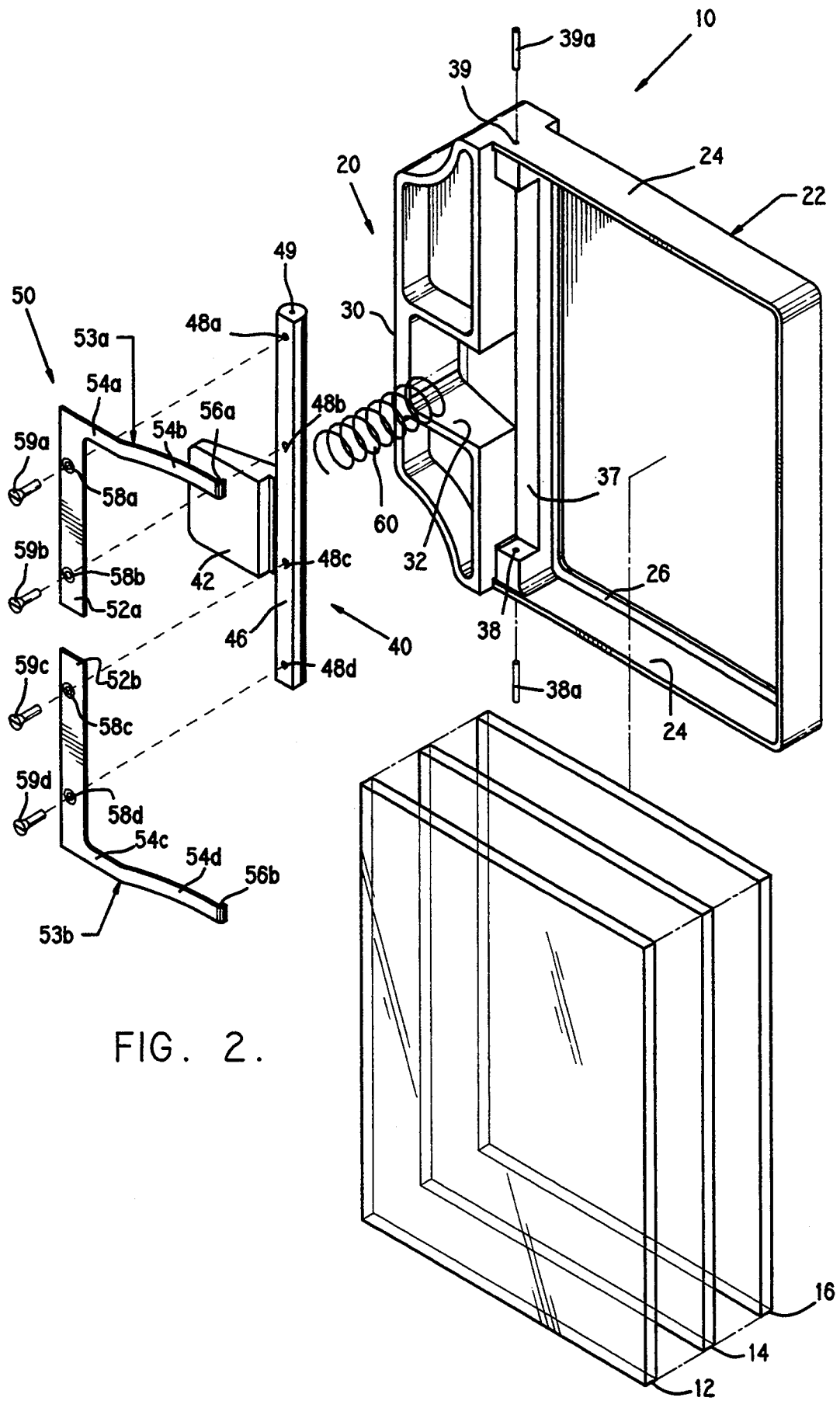
FIG. 2 is an exploded perspective view of the filter holder assembly as in FIG. 1.
Figure 4:
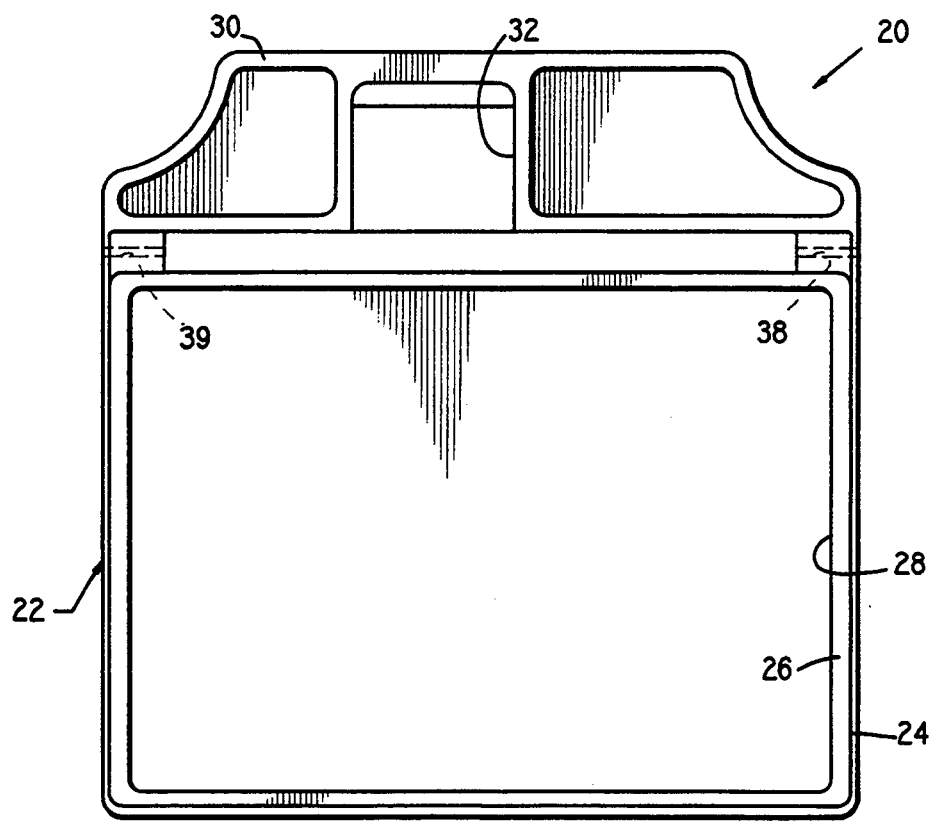
FIG. 4 is a front elevation view of a housing portion of the filter holder of FIG. 2.
Figure 5:
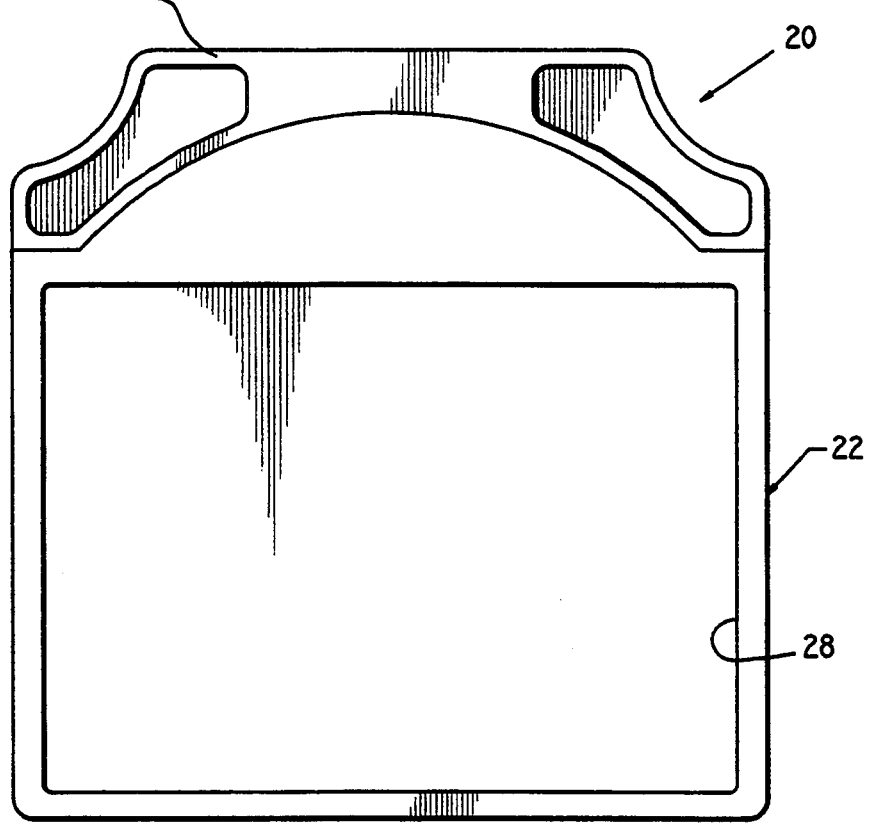
FIG. 5 is a rear elevation view of the housing portion of FIG. 4.
Figure 6:
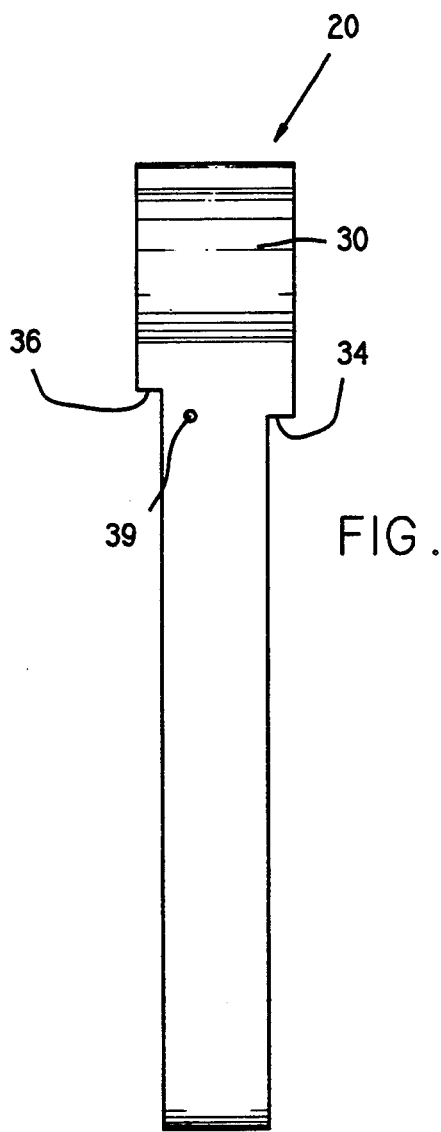
FIG. 6 is a left side elevation view of the housing portion of FIG. 4.
Figure 8:
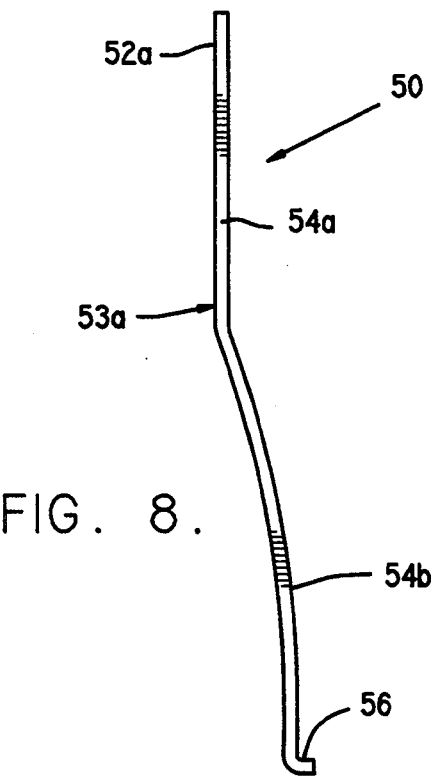
FIG. 8 is a left side elevation view of the holder arm of FIG. 7.
Figure 7:
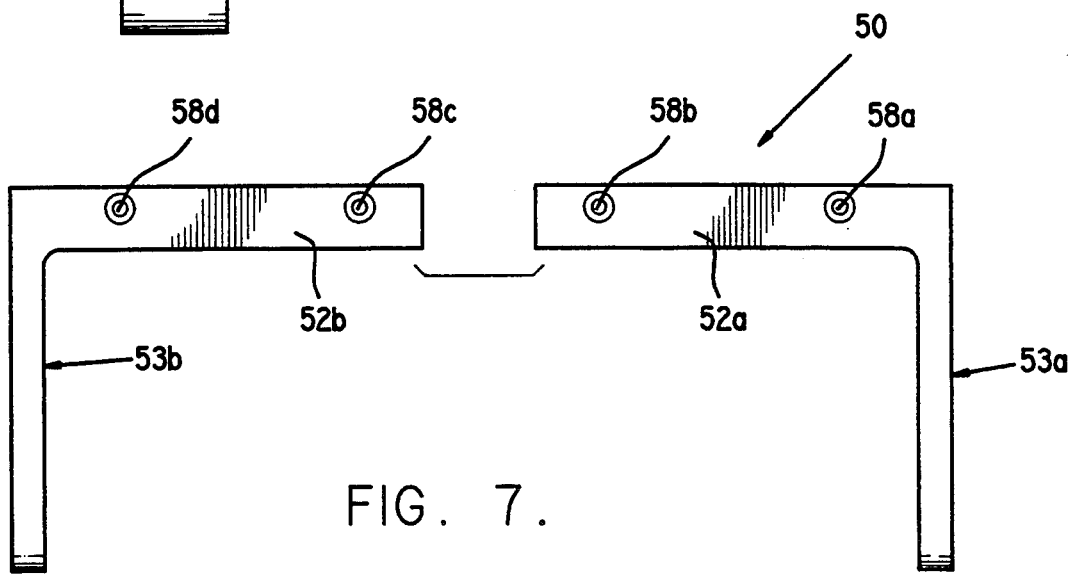
FIG. 7 is a front elevation view of the holder arm of the filter holder of FIG. 2.

The preferred embodiment of the present invention will now be described with reference to the drawings. To facilitate the description, a reference numeral representing an element in one figure will represent the same element in any other figure.

FIG. 1 is a perspective view illustrating the filter holder assembly 10 which is insertable into a matte box assembly 5 according to a preferred embodiment mounted of the present invention. The matte box 5 is in turn mounted to a camera 1 in front of a lens 2. FIG. 1 illustrates the filter holder assembly 10 partially inserted into the matte box assembly 5. The filter holder assembly 10 is sized to fit in the slot 6 within the matte box 5 with the pivoting door 7 pivoted out of the way to allow insertion. The pivoting door 7 does not serve any function in this embodiment.

FIG. 2 is an exploded view of the filter holder assembly 10 which includes a frame portion 20, a plurality of filters shown in this embodiment with three filters 12, 14, 16, a pivot bar 40, and a filter holder arm 50.

The holder frame 20 includes a rectangular frame member 22 having a side wall portion 24 and an inwardly extending lower ledge portion 26. A standard size filter such as bottom filter 16 may be placed within the rectangular frame member 22 and the edges of the filter 16 engage the lower ledge portion 26. Subsequent filters 12, 14 are stacked on top of the lower filter 16 in a parallel face-to-face relationship. The filters 12, 14, 16 do not require any frame or edge elements and preferably have no edge or individual frame construction which protrudes outwardly from the surface of the filter on either side. In the absence of any outwardly protruding individual frame elements, when stacked face-to-face the filters 12, 14, 16 are in a touching relationship with no gap therebetween.

The holder frame 20, also illustrated in FIGS. 3–6, includes a handle portion 30 with a central cutout 32 in which the trigger 42 of the pivot rod 40 is inserted. The handle portion 30 includes a front lift 36 and a rear lift 34. The front and rear lips or ledges 36, 34 act as stops to halt the insertion of the holder frame 20 into the slot 6 and also cover the opening of the slot 6 to prevent entry of light thereinto.

The biasing means comprising pivot rod 40, U-shaped holder arm 50 and spring 60 retain the filters 12, 14, 16 within the rectangular frame portion 22. The pivot rod 40 includes a rod portion 46 which is disposed within the frame slot 37 pivoting on pivot rods 38a, 39a which are inserted through respective holes 38, 39 within the sides of the rectangular frame portion 22. The spring 60 is disposed in the cutout 32 and engages the underside of a cavity 44 of the trigger 42. The trigger 42 is attached to the rod portion 46 and is preferably integrally formed in a single piece therewith.

The pivot rod portion 46 includes four threaded holes 48a, 48b, 48c, 48d to allow attachment of the U-shaped holder arm 50. The holder arm 50 includes a center section 52a, 52b having holes 58a, 58b, 58c, 58d which correspond to the respective holes 48a–d on the pivot rod 46. The U-shaped holder arm 50 is secured to the pivot rod 46 by screws 59a, 59b, 59c, 59d.

The holder arm 50 includes extending arm elements 53a, 53b which extend outwardly in the same direction from opposite sides of the center piece 52. Extending arm element 53a includes a straight section 54a, an outer curved portion 54b and a bent tip portion 56a. Similarly, extending arm element 53b includes a straight section 54c, an outer curved portion 54d and a bent tip portion 56b.

The entire holder arm 50 is preferably made from a structural standpoint out of a single piece of metal. However, since the preferred metal is beryllium which is quite expensive, so the holder arm 50 may be made out of two separate arm pieces 53a, 53b to reduce construction costs. One of the arm pieces 53a is secured to pivot rod 40 at its center section 52a by screws 59a, 59b and the other arm piece 53b is secured at its center section 52b by screws 59c, 59d. The material of construction is sufficiently stiff but also flexible so as to permit the extending arm portions 53a, 53b to act as leaf springs. The leaf spring function of the extending arm portions 53a, 53b combine with the biasing of the pivot rod 40 by coiled spring 60 (as best viewed in FIG. 3) to press the top filter element 12 compressing the filters 12, 14, 16 against the ledge 26 thereby eliminating or minimizing any air gaps between the filters and holding them securely in place. The filters are inserted and removed by squeezing the trigger 42, compressing the spring 60 and pivoting the holder arm portions 53a, 53b clear of the filters to allow removal or insertion.

The holder arm 50 contacts the top filter element 12 on the top surface near the side edges thereof. The extending arm portions 53a, 53b have a narrow width to minimize protrusion into the center of the filter area.

In this arrangement, the filters 12, 14, 16 are pressed in a face-to-face relationship against one another with any air gap therebetween essentially eliminated. The filter holder assembly 10 is a self contained unit and allows use of one or more filters without any special or expensive frame mechanisms and maximizes the number of filters which may be placed in a given area in the matte box.

The filter holder assembly 10 may be constructed of any suitable size to accommodate desired filter size or sizes. The illustrated embodiment accommodates standard 4 inch by 5.6 inch (10 cm. by 14.22 cm.) filters but other suitable filter sizes and shapes may be employed including other size square or rectangular filters or even a round assembly. In a round filter version, the frame portion and the holder arms would be adapted to accommodate the round filter geometry. Individual adapter frame elements, preferably without any thickness protrusion, may be employed to permit use of different size filters in a given filter holder assembly.

Since the filter frame accommodates filter in a face-to-face relation with no air gap, a larger number of filters may be employed within the same space. Due to the minimal thickness required by the filters that are compressed, more filters may be used with no vignetting, that is, without cutting off the sides, top or corners of the image. Such an arrangement not only accommodates more filters but the filters may be smaller and still accommodate the desired image size.

With the filters 12, 14, 16 inserted within the frame portion 22, all the edges of the filters 12, 14, 16 abut the surface of the sides 24 of the frame 22. Light is thereby excluded from entering through the sides of the filters which could otherwise degrade photographic performance. In a standard matte box, filters with individual holders are inserted into the slot 6 and once inserted the door 7 is pivoted into place closing off the opening of the slot 6 to prevent passage of light into the slot 6. Currently employed practices of using black tape, black cloth or a door flap are not required as the filter frame 20 traps all the light in a simple and effective construction.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A filter mechanism for a matte box of a camera comprising
   a holder frame;
   a plurality of filters insertable into the holder frame, the plurality of filters being stacked in parallel one next to the other within the holder frame;
   biasing means for pressing the plurality of filters together in a touching relationship to eliminate air gaps therebetween.

2. A filter mechanism for a matte box of a camera comprising
   a holder frame;
   a plurality of filters insertable into the holder frame, the filters being stacked in parallel one next to the other within the holder frame;
   biasing means for pressing the filters together to eliminate air gaps therebetween,
   wherein the biasing means comprises a spring loaded pivot rod having first and second outwardly extending holder arms on opposite ends of the pivot rod.

3. A filter mechanism according to claim 2 wherein the first and second holder arms comprise leaf spring elements.

4. A filter mechanism according to claim 2 wherein the biasing means comprises a spring loaded pivot rod having a U-shaped holder arm comprising a central portion attached to the pivot rod and first and second arm portions outwardly extending from opposite ends of the pivot rod for contacting edges of a top of one of the filters.

5. A filter mechanism for a matte box of a camera comprising
   a holder frame;
   a plurality of filters, including at least a first filter and a second filter, insertable into the holder frame, the first and second filters being stacked in parallel one next to the other within the holder frame; and
   biasing means for pressing the filters together wherein the holder frame comprises an outer frame member with a central aperture and a ledge portion against which the first filter is placed, the biasing means pressing the second filter toward the first filter with the first filter being held between the ledge portion and the second filter.

6. A filter mechanism for a matte box of a camera comprising
   a rectangular frame member having an inwardly extending lower ledge portion, a plurality of filter elements stacked in a parallel relationship, one on top of the other, with a bottom filter element placed against the lower ledge portion and a top filter element held in place by a spring biased holder arm having arm elements which engage a top surface of the top filter near edges thereof.

7. A filter mechanism according to claim 6 wherein the arm elements comprise leaf spring portions to assist in holding the top filter element in place.

8. An apparatus for holding a plurality of filter elements for a matte box on a camera comprising
a rectangular frame member having an inwardly extending ledge portion;
a plurality of filter elements including a bottom filter element and a top filter element, the filter elements stacked face to face in the frame in touching relationship to one another, one on top of the other, with the bottom filter element engaging the ledge portion of the frame member,
a holder which holds the top and bottom filter elements in place by urging the top filter element against the bottom filter element, holding the bottom filter element between the ledge portion and the top filter element.

9. A filter mechanism for a matte box of a camera comprising
a rectangular frame having an inwardly protruding shoulder on one end thereof;
a plurality of filter elements stackable within said rectangular frame in a face-to-face relationship against the shoulder;
a spring biased holder mechanism comprising
a holder arm pivotally mounted on one end of the rectangular frame and
a pair of outwardly extending arm members on opposite ends of the holder arm engaging top side edges of one of the filter elements, said arm members urging the filter elements together to eliminate air gaps therebetween.

10. A filter mechanism according to claim 9 wherein the holder is spring biased.

11. A camera system comprising:
a camera;
a lens mounted to the camera;
a matte box assembly positionable in front of the lens;
a filter holder assembly insertable into the matte box assembly, said filter holder assembly including a rectangular frame member having an inwardly extending ledge portion; and
a plurality of filter elements including a bottom filter element and a top filter element, the filter elements stacked face to face in the frame in touching relationship to one another, one on top of the other, with the bottom filter element engaging the ledge portion of the frame member,
a holder which holds the top and bottom filter elements in place by urging the top filter element against the bottom filter element, holding the bottom filter element between the ledge portion and the top filter element.

12. A filter mechanism according to claim 1 wherein the biasing means comprises a spring loaded holder arm contacting a periphery of one of the filters.

13. A filter mechanism according to claim 1 wherein the plurality of filters comprises a first filter element, a second filter element and a third filter element, the filter elements being stacked together in face to face arrangement with the third filter element being sandwiched between the first filter element and the second filter element.

14. A filter mechanism according to claim 1 wherein the filters do not have any frame or edge elements.

15. A filter mechanism according to claim 2 wherein the filters are stacked face to face in touching relationship.

16. A filter mechanism according to claim 5 wherein the filters are stacked face to face in touching relationship.

17. A filter mechanism according to claim 5 wherein the biasing means comprises a spring loaded holder arm contacting a periphery of the second filter.

18. A filter mechanism according to claim 5 further comprising a third filter positioned between the first filter and the second filter.

19. A filter mechanism according to claim 5 wherein the holder frame is rectangular.

20. An apparatus according to claim 8 further comprising a spring loaded holder arm contacting a periphery of the top filter element and urging the top filter element toward the bottom filter element.

21. A filter mechanism according to claim 8 wherein the plurality of filters comprises a first filter element, a second filter element and a third filter element, the filter elements being stacked together with the third filter element being sandwiched between the first filter element and the second filter element.

22. A camera system according to claim 11 further comprising a spring loaded holder arm contacting a periphery of the top filter element and urging the top filter element toward the bottom filter element.

23. An apparatus for holding one or more filter elements for a camera comprising
a frame member having an inwardly extending ledge portion constructed and arranged to accept a plurality of filters in a stacked arrangement;
a spring mechanism which urges the plurality of filters against one another with one filter being urged against the ledge portion of the frame member.

* * * * *